United States Patent [19]
Denk

[11] Patent Number: 5,325,005
[45] Date of Patent: Jun. 28, 1994

[54] MOTOR COMMUTATION

[75] Inventor: Joseph Denk, Manhattan Beach, Calif.

[73] Assignee: AlliedSignal Inc., Morris Township, Morris County, N.J.

[21] Appl. No.: 894,000

[22] Filed: Jun. 3, 1992

[51] Int. Cl.$^5$ .................. H02K 11/00; H02K 1/12; G01B 7/14

[52] U.S. Cl. .................. 310/68 B; 310/256; 310/DIG. 3; 324/207.25

[58] Field of Search .................. 310/68 R, 68 B, 156, 310/DIG. 3, 256; 318/138, 254; 324/179, 207.2, 207.25, 207.11

[56] References Cited

U.S. PATENT DOCUMENTS

| | | | |
|---|---|---|---|
| 3,805,134 | 4/1974 | Osamu et al. | 318/254 |
| 4,434,389 | 2/1984 | Langley et al. | 318/254 |
| 4,629,948 | 12/1986 | Tassinario | 310/68 R |
| 4,674,178 | 6/1987 | Patel | 310/156 |
| 4,850,812 | 7/1989 | Voight | 310/68 R |
| 4,952,830 | 8/1990 | Shirakawa | 310/68 B |
| 4,992,688 | 2/1991 | Cap et al. | 310/71 |
| 5,053,664 | 10/1991 | Kikuta et al. | 310/68 B |
| 5,148,070 | 9/1992 | Frye et al. | 310/68 B |

FOREIGN PATENT DOCUMENTS

| | | | |
|---|---|---|---|
| 0201668 | 11/1984 | Japan | 310/68 R |
| 0043044 | 2/1989 | Japan | 310/68 B |
| 1135119 | 11/1968 | United Kingdom | 310/68 R |

*Primary Examiner*—Steven L. Stephan
*Assistant Examiner*—C. LaBalle
*Attorney, Agent, or Firm*—Joseph R. Black; Robert A. Walsh

[57] ABSTRACT

A brushless electric motor with Hall-effect sensors is configured to provide its stator structure with a portion which projects axially away from a main armature. The projecting portion is radially congruent with a second, smaller armature coaxial with the main armature, with a portion of a sleeve in which the sensors are disposed in circumferentially spaced configuration, and with a laminated annular shield iron. The annular shield iron is radially interposed between the projecting portion of the stator structure and the sensors. In this configuration, the shield iron serves to close the magnetic field originating from the second armature and interacting with the sensors while simultaneously shielding the sensors from field effects attributable to current flow in the axially projecting portion of the stator structure.

13 Claims, 2 Drawing Sheets

MOTOR COMMUTATION

The present invention is in the field of electric motors. Particularly, the present invention relates to brushless electric motors wherein a sensor of the magnetic proximity or Hall-effect type is responsive to a magnetic field supplied by a rotary component of the motor to result in the electrical switching of power to stator field coils of the motor. The rotary component has a known angular orientation relative to a motive magnetic field of the motor, and the Hall-effect sensor is selectively adjustable to angularly vary commutation events relative to the stator field. The Hall-effect device is shielded from undesirable interference from operating stator field coils of the motor from stator harmonics, and from other electromagnetic interference (EMI).

The technology known to the Applicant which is closest to the present invention is set forth in U.S. Pat. No. 4,642,496, issued 10 Feb. 1987, to A. Kerviel, et al. The '496 patent is believed to teach a brushless electric motor wherein a disk rotor member carries a plurality of axially-disposed magnets of circular segmental shape. These magnets axially confront a plurality of magnetic proximity sensors which are carried upon a printed circuit board. The circuit board is in turn carried within a sensor housing angularly adjustable on the motor housing.

The electric motor as taught by Kerviel in the '496 patent is believed to be undesirably long because of the provision of the commutation sensor as a separate housing essentially stacked axially with the remainder of the electric motor. Also, the powerful magnetic fields associated with a permanent magnet rotor of the machine, as well as the electromagnetic stator fields, which the sensor is to commutate, can have an interfering influence on the magnetic proximity sensors.

Accordingly, the present invention provides a commutation sensor which is axially nested with essential structure of the motor, yet is protected from interference by magnetic fields from the stator of the motor, and provides for angular adjustment of the Hall-effect sensors relative to the stator of the motor. Also, the commutation sensor includes a disk-like rotor having commutation magnetic poles aligned with and of like polarity with the motive permanent magnet poles of the motor rotor. A decreased overall length for the motor results from this invention, while a highly reliable and accurate commutation sensor is provided.

In view of the above, the present invention provides an advantage over those conventional motors which attempt to utilize armature motive flux end leakage to trigger commutation sensors. These conventional motors frequently encounter interference of the rotating stator magnetic field, of stator transients, and of other EMI with the commutation sensors. Also, the commutation poles are like and aligned with the motive magnet poles of the motor rotor. Thus, while the commutation sensors are shielded, the possibility of opposition of the permanent magnet motive flux with the commutation flux is eliminated by my invention.

Additional features and advantages will be apparent from a reading of the following detailed description of a single preferred embodiment of the invention, taken in conjunction with the following drawing Figures in which.

Figure 1:
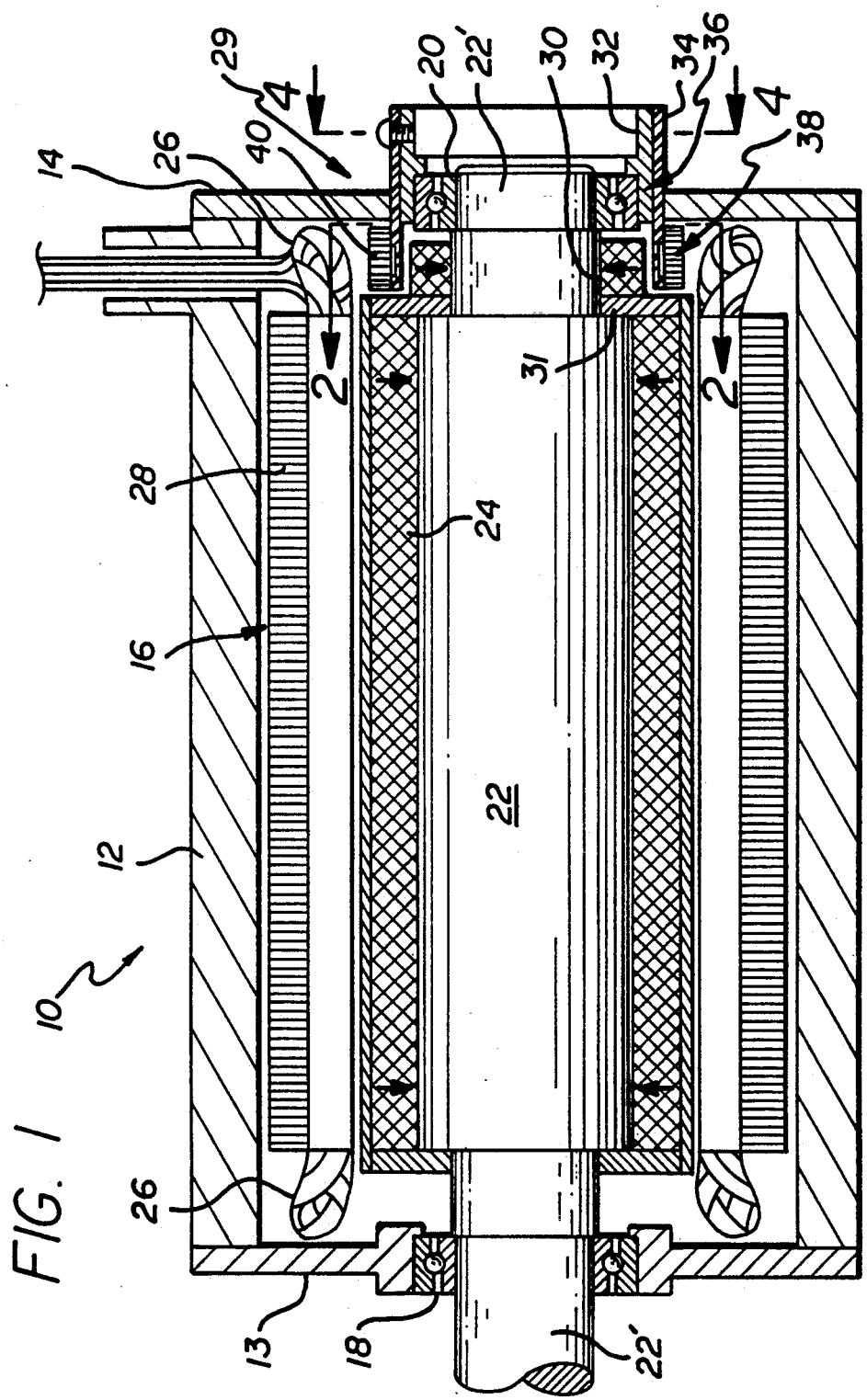
FIG. 1 depicts a longitudinal view, partly in cross section, of an electric motor embodying the invention.

Viewing FIG. 1 an electric motor 10 includes a casing 12 having end bells 13 and 14. An annular stator structure 16 is received within the casing 12 between the end bells 13 and 14. Bearings 18 and 20 which are carried in the end bells 13 and 14 journal an armature 22 Within the annular stator structure 16. The armature structure 22 includes elongate masses of permanent magnet material which are referenced with the numeral 24. In the depicted embodiment, the armature 22 has four poles. See, U.S. Pat. No. 4,549,341, for example. The stator structure 16 includes conductive windings which have end turns 26 projecting axially beyond the ends of the stator iron 28 towards the end bells 13 and 14. Motor 10 includes a commutation sensor generally referenced with numeral 29. Carried on the armature 22 axially adjacent to the magnetic material 24 but separated slightly therefrom is an annular composite disk member 30, which is virtually a smaller version of the armature 22, also including masses of magnetic material, which masses are of considerably smaller size than the motive magnetic material 24. However, the magnetic poles of armature 22 and of disk member 30 are like and aligned axially with one another and are physically separated by end spacer 31. The one end bell 14 adjacent to the disk 30 also includes an axially extending outward boss 32 which on its outer peripheral surface carries an annular-sleeve like member 34 extending axially inward of the motor casing through slots 36 defined in the end bell 14. Inwardly of the end bell 14, the sleeve member 34 defines a circumferentially continuous ring portion 38 carrying on its radially outer surface an annular laminated shield iron structure 40.

Figure 2:
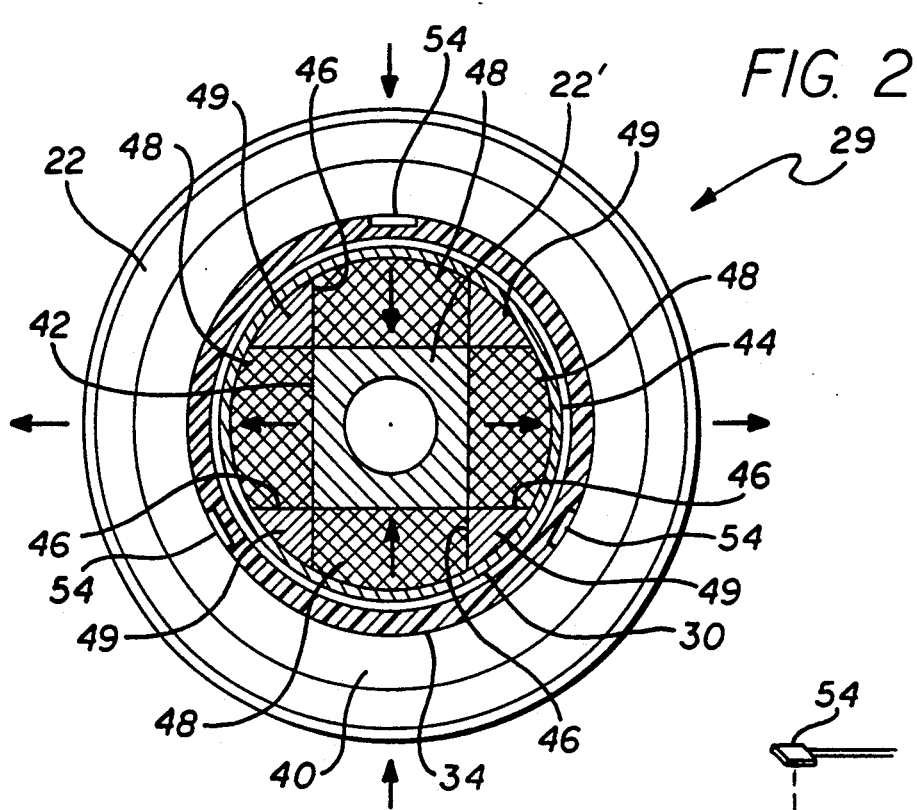
FIG. 2 is an enlarged fragmentary axial cross sectional view taken at line 2—2 of FIG. 1, and viewed in the direction of the arrows.
Figure 3:
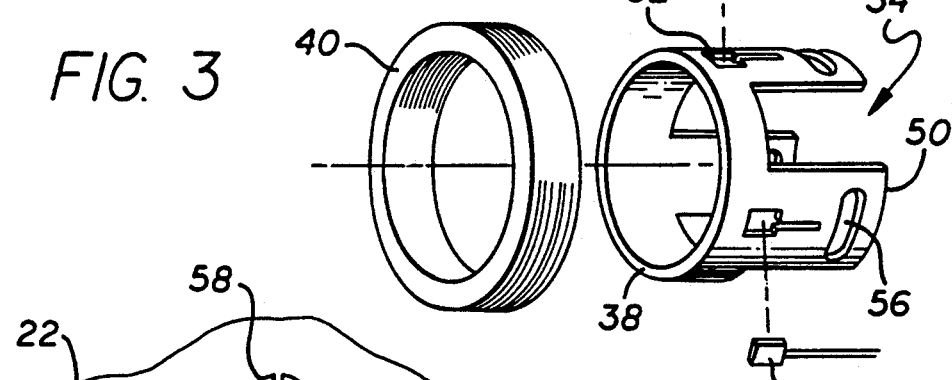
FIG. 3 is an exploded perspective view of component parts of the motor depicted in FIGS. 1 and 2.
Figure 4:
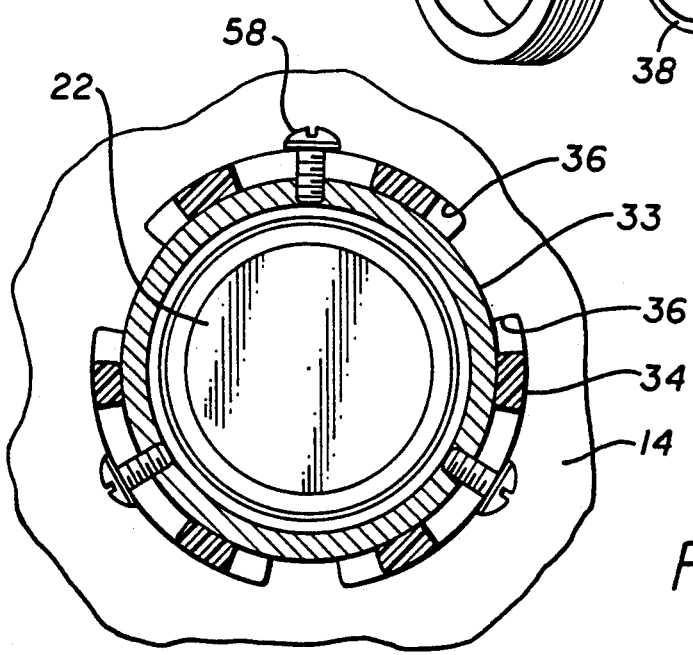
FIG. 4 is an enlarged fragmentary axial view partly in cross section and taken at line 4—4 of FIG. 1 with the view being in the direction of the arrows.

Viewing now FIGS. 2, 3, and 4 in conjunction with FIG. 1 it will be seen that the disk member 30 includes a back iron portion 42 which is defined by a part of the shaft member 22. The back iron part 42 is square in axial cross section and carries thereon a non-magnetic disk structure 44 which disk structure defines four circumferentially evenly spaced pockets 46. Within the pockets 46 are received masses of magnetic material 48 which are arranged with circumferentially alternating signal-flux magnetic poles oriented radially outwardly toward the sleeve member 34. Viewing FIG. 2, the flux direction arrows for magnets 48 are seen to be aligned with and in the same direction as those from rotor 22. The disk structure 30 includes a non-magnetic, but magnetically permeable containment sleeve 44.

FIG. 3 depicts that the sleeve member 34 includes three axially extending leg members 50 which extend through the slots 36 in the end bell 14. Aligned with the legs 50 and extending from the ring portion 38 of the sleeve member 34 are three recesses located 120° apart and referenced with the numeral 52. The recesses 52 extend axially from the ring member toward the end of each leg 50 through the slots 36. Received into each of the recesses 52 is one of a like plurality of a Hall-effect magnetic proximity sensors referenced with the numeral 54. Immediately radially outside of the sensors 54 is disposed the laminated shield iron 40 so that the sensors 54 rest at their radially outer surface against the shield iron 40 as is depicted in FIG. 2. In the depicted embodiment, the Hall-effect sensors are three in number and the stator windings 26 are arranged for three phase commutated power supply. Other numbers of magnetic poles on armature 22, of Hall-effect sensors 54, and of phases in windings 26 are possible in accord with my invention. However, the number of Hall-effect sensors 54 will be equal to the number of phases in the stator windings 26.

Viewing particularly FIG. 4 it will be seen that the legs 50 of the sleeve member 34 extend through the slots 36 with a circumferential clearance. Each leg 50 terminates at an end portion wherein is defined a circumferentially extending slot 56. A like number of threaded fasteners 58 pass through the slots 56 with circumferential clearance and are threadably received into the boss portion 32 of the end bell 14. Accordingly it will be understood that the sleeve member 34 and the Hall-effect sensors 54 carried thereon are angularly adjustably positionable relative to the end bell 14 and therefore relative to the stator structure 16 of the motor 10.

Returning to FIG. 1, it will be seen that the commutation sensor 29 including disk 30, sleeve member 34 having ring portion 38 carrying shield iron 40 and receiving the Hall-effect sensors 54 is axially nested with the axially projecting end turn portions of the windings of stator 16. Despite this axial nesting with the stator structure 16 the annular shield iron 40 is effective to prevent interference of the rotating electromagnetic field from stator 16 with the Hall-effect sensors 54 carried within sleeve 34. Shield iron 40 also prevents stator transients and other EMI from reaching the sensors 54. In other words, the Hall-effect sensors are magnetically responsive only to the signal flux from the permanent magnet material 48 of disk member 30. The commutation flux from magnets 48 cannot oppose or be interfered with by the motive flux from magnets 24 of armature 22, because the poles of these magnets are of like polarity and are axially aligned one with the other.

The Applicants have built and tested a motor made in accord with the present invention and have found that there is substantially no interference from the electromagnet rotating stator field, from stator transients, or from other EMI, with the commutation signals generated at Hall-effect sensors 54 in response to the passages of the magnetic poles from magnets 48 carried within disk 30 as the armature 22 rotates with disk 30.

I claim:

1. A brushless electric motor having a casing wherein is received an annular stator structure with stator iron and winding end turns extending axially from said stator iron, an armature member journaled for rotation within said stator structure and defining magnetic poles, said armature member including an annular disk member rotating therewith and including a number of permanent magnet commutation poles equal in number to of like polarity and aligned axially with the magnetic poles of said armature member, said casing carrying a non-magnetic sleeve member extending axially inward of said motor to at a ring portion thereof axially nest in substantial radial congruence both with an end turn of said stator structure and with said disk member, said sleeve member radially outwardly carrying a laminated annular shield iron and defining recesses immediately radially inward of said shield iron, and a magnetic proximity sensor received in each of said sleeve member recesses, thereby to provide commutation signals in response to rotation of said armature member and disk.

2. The invention of claim 1 wherein said sleeve member and said motor casing further include cooperating means for selectable angular adjustment therebetween.

3. The invention of claim 2 wherein said cooperating means includes said motor casing including an end bell portion carrying a bearing for said armature member, said end bell defining an axially extending annular boss circumscribing said bearing, and said sleeve member being rotatably received upon said boss.

4. The invention of claim 3 wherein said boss extends axially outwardly of said motor, said sleeve member defining a plurality of outwardly axially extending legs, and said end bell defining a matching plurality of arcuate through slots radially outwardly of said boss and axially passing said legs with circumferential clearance.

5. The invention of claim 4 further including each leg of said sleeve member terminating in an end portion defining a circumferential slot therein, said cooperating means further including a like plurality of fasteners received in said circumferential slots and threadably engaging said boss.

6. The invention of claim 1 wherein said disk member includes a magnetic back iron part defined by a shaft portion of said rotor, a nonmagnetic body circumscribing said shaft back iron part to defined pockets opening radially thereon, and a plurality of permanent magnets having circumferentially alternate magnetic polarities received into said pockets and engaging said back iron part.

7. The invention of claim 1 wherein said armature member includes at least one mass of permanent magnet material having a pair of magnetic poles oriented radially and said mass extending axially within said rotor member, said disk member being located axially adjacent an axial end of said mass.

8. A commutation sensor circumscribing a shaft whereon is carried a rotating transverse disk-like body presenting circumferentially alternate magnetic poles arrayed radially outwardly circumferentially about said body, and a non-magnetic sleeve member circumscribing said body and at a circumferential ring portion thereof being in radial congruence therewith, said sleeve member defining at least one cavity at said ring portion wherein is received a magnetic proximity sensor, and a annular magnetic shield iron carried upon and circumscribing said sleeve member at said ring portion to surround both said disk-like body and said proximity sensor.

9. The invention of claim 8 wherein said disk-like body includes a magnetic back iron part defined by said shaft, a non-magnetic body surrounding said back iron part and defining circumferentially arrayed pockets extending radially outwardly from said pole piece to open on said body, a mass of permanent magnet material received in each said pocket and radially outwardly presenting a magnetic pole, said permanent magnets being of even number and presenting circumferentially alternate magnetic poles.

10. The invention of claim 9 further including means for selectively altering the angular position of said sleeve member.

11. A method of commutating an electrical machine having a rotational shaft, said method comprising the steps of: providing on said shaft a disk-like body presenting radially-outwardly disposed circumferentially alternate magnetic commutation poles; circumscribing said disk-like body with a non-magnetic non-rotational sleeve; imbedding a magnetic proximity sensor in said sleeve in radial congruence with said magnetic commutation poles; carrying upon said sleeve an annulus of magnetic shield iron in radial congruence with said magnetic commutation poles, and utilizing said shield iron to substantially shield said proximity sensor from all magnetic flux save that from said commutation poles.

12. The method of claim 11 further including the step of selectively angularly moving said sleeve relative to a non-rotational reference.

13. The method of claim 12 wherein the step of providing said disk-like body includes the steps of providing an annular magnetic pole piece for receipt upon said shaft, surrounding said pole piece with a non-magnetic body defining pockets extending radially outwardly therefrom to open radially upon said body, and providing a permanent magnet in each said pocket to present circumferentially alternate magnetic poles radially outwardly arrayed circumferentially on said disk-like body.

* * * * *